(No Model.) 2 Sheets—Sheet 1.

F. DICKEY.
CAR COUPLING.

No. 484,412. Patented Oct. 18, 1892.

Witnesses
Jno. G. Hinkel
Alle N. Dobson

Inventor
Foster Dickey
By Foster Freeman
Attorneys (No Model.) 2 Sheets—Sheet 2.

F. DICKEY.
CAR COUPLING.

No. 484,412. Patented Oct. 18, 1892.

Witnesses
Inventor
Foster Dickey
By
Attorneys

UNITED STATES PATENT OFFICE.

FOSTER DICKEY, OF SCHUYLER, NEBRASKA, ASSIGNOR TO HIMSELF, HENRY C. WRIGHT, NATHAN W. WELLS, HENRY W. NIEMAN, AND CHAUNCY ABBOTT, OF SAME PLACE.

CAR-COUPLING.

SPECIFICATION forming part of Letters Patent No. 484,412, dated October 18, 1892.

Application filed February 18, 1892. Serial No. 422,052. (No model.)

*To all whom it may concern:*

Be it known that I, FOSTER DICKEY, a citizen of the United States, residing at Schuyler, Colfax county, Nebraska, have invented certain new and useful Improvements in Car-Couplings, of which the following is a specification.

My invention relates to certain improvements in car-coupling devices fully set forth hereinafter, and illustrated in the accompanying drawings, in which—

Figure 1:
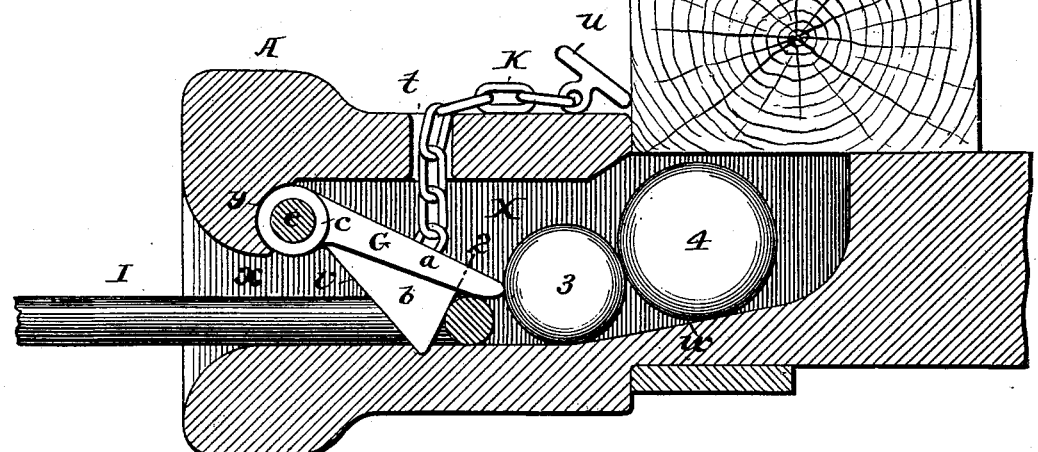
Figure 2:
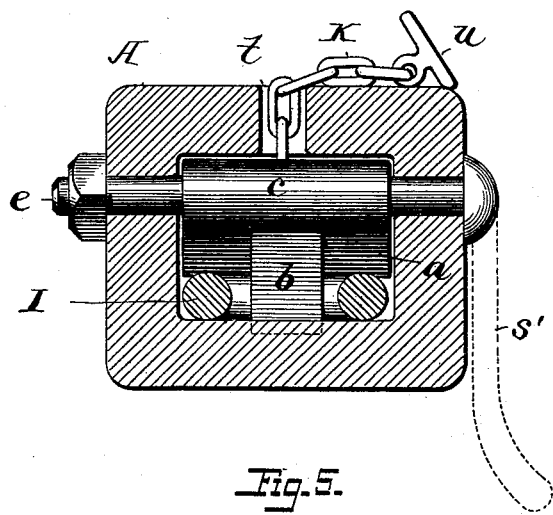
Figure 5:
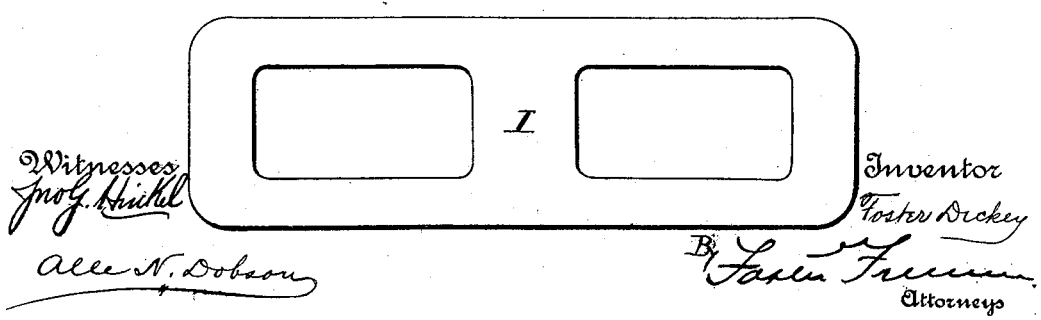
Figure 3:
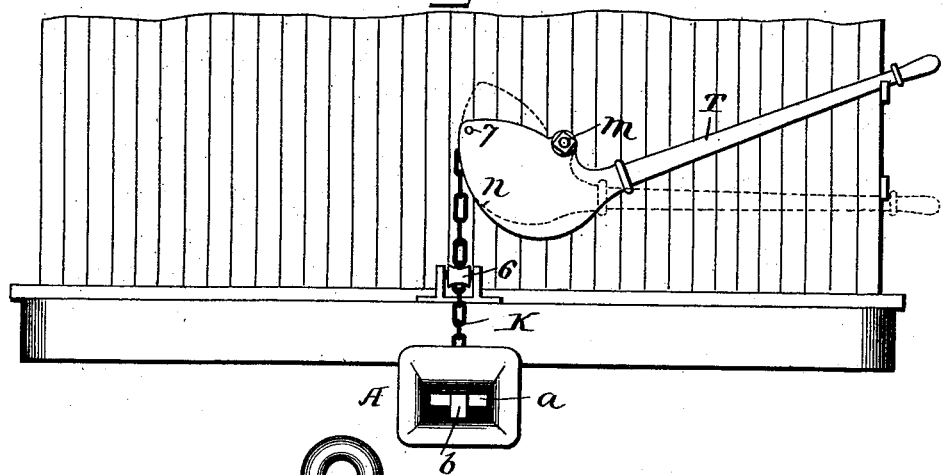
Figure 4:
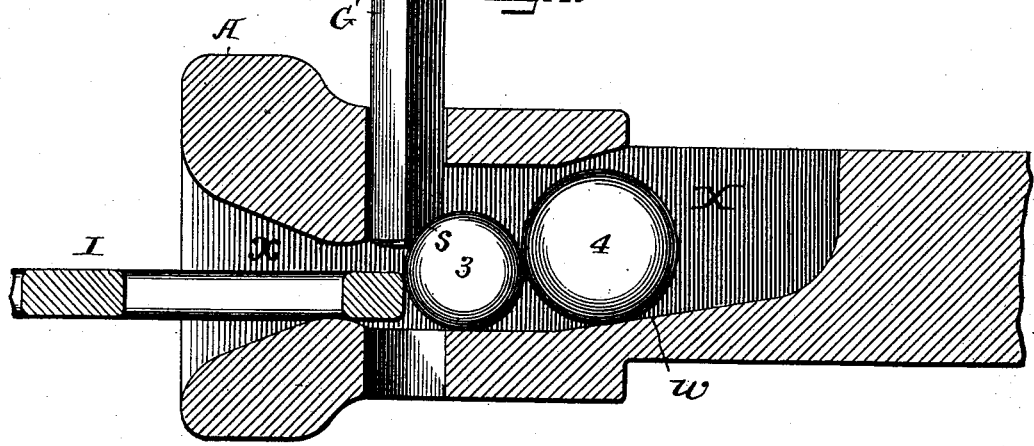

Figure 1 is a sectional view of sufficient of a draw-head to illustrate one form in which my improvement may be embodied. Fig. 2 is an end view of Fig. 1. Fig. 3 shows the draw-head as secured to a car-coupling. Fig. 4 illustrates the invention in connection with a coupling-pin. Fig. 5 shows another form of link, and Fig. 6 another form of rolls.

The draw-head A may be of any suitable material and any suitable form or construction. As shown, it is represented as being made of cast metal of ordinary form and proportions and with the usual opening or slot $x$ at the end leading to the chamber X, in which the end of the link is locked to the pin or other retaining device.

In the construction shown in Figs. 1, 2, and 3 the link-retaining device is in the form of a pivoted dog consisting of a plate $a$ and a tongue $b$, the plate having a rounded head or end $c$, adapted to a socket $y$, formed transversely in the draw-head, so that the draft of the link shall force this head into the socket, which will resist all the strain. This enables the dog to be secured by a transverse pin $e$, against which no strain comes, so that the said pin may be made of very light material. The tongue $b$ is of a shape to enter the opening in the link I and has a forward beveled edge $v$, so that when the dog is in the inclined position shown in Fig. 1 and the link is passed into the mouth $x$ its end will strike the inclined side $d$ of the tongue and lift the dog until the end of the link passes beyond the tongue, when the dog will fall to the position shown in Fig. 1, with the tongue inside the opening of the link, retaining the latter, so that it cannot be drawn out while the plate $a$ bears upon the top of the link and holds it in a horizontal position. The latter is not necessary, however, as the plate $a$ might be cut off on the line 2, Fig. 1, as described hereinafter.

Instead of a dog, pivoted as shown in Fig. 1, the retaining device may be in the form of a pin G′, and the link instead of being made of round bar-iron, as usual and as shown in Fig. 1, may be made of a flattened plate punched out, as shown in Figs. 4 and 5.

Figure 6:
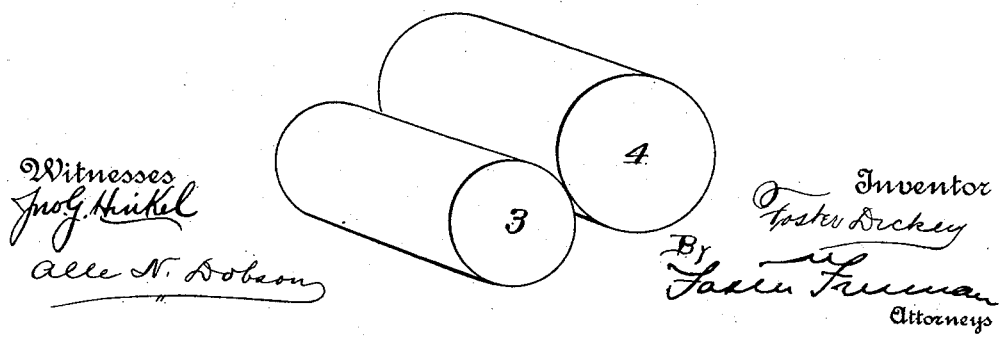

In connection with the above-described parts I make use of two rollers 3 4, which may be spheres, as illustrated in Figs. 1 to 4, or they may be disks or cylinders, as illustrated in perspective in Fig. 6, and I form the draw-head with an inclined bearing-face $w$, upon which the spheres roll toward the retaining device.

The object of the spheres or rollers 3 4 is to hold the retaining device in its upward position when the link must be withdrawn, so that upon the introduction of another link or the same link a second time the spheres will be removed out of position and allow the retaining device to drop to secure the link.

It has been proposed heretofore to use a single sphere for the purpose of holding the retaining device in proper position; but this is objectionable because it necessitates either that the draw-bar shall be made very deep, so as to permit the spheres to move almost vertically upward after the link is introduced, or else the inclined face $w$ must be placed so far back of the retaining device that it cannot be depended upon to move the sphere forward far enough to get beneath the retaining device and hold it in its upward position.

By the use of two rollers or spheres, one bearing upon the other, as illustrated, the face $w$ may have a very moderate inclination and extend back as far as desired, so as to avoid increasing the height of the draw-bar. At the same time, while the forward sphere would not of itself certainly roll forward to a position beneath the retaining device, the rear sphere is always bearing upon the inclined face and also upon the forward sphere and forces it inevitably to such a position as to move beneath the retaining device as soon as the latter is elevated. Further, when there are two spheres I avoid the chance of failing to secure the retaining device in its elevated position, which is apt to result when a single sphere is used, because in the use of a single sphere jolts or jerks will be apt to throw it back and out of the way of the retaining device, while in the case of two spheres the jerking movements do not have such an effect and the pressure is always to force the inner sphere toward the retaining device. This permits me to extend the level bottom surface of the chamber of the draw-head back to a considerable distance behind the retaining device to afford a flat bearing for the link to hold it in its horizontal position for engaging another draw-head, and at the same time insures the forward movement of the retaining-sphere 3 whenever the retaining device is raised. One of the chief advantages of this construction is that while the forward sphere or roller is necessarily limited in height for the purpose of avoiding increase in the height of the draw-head it is possible to make the rear roller very much larger in diameter, and thereby secure the heavy weight of the rear roller and the more certain action of the front roller than would otherwise be possible.

When a sliding pin G' is used for a retaining device, as shown in Fig. 4, I prefer to cut away one side to form a notch s to receive the surface of the retaining-roller, and in this case it is best to make the pin of angular iron, so that it will not turn in its socket. When the retaining device is in the form of a dog G, as shown in Figs. 1 to 3, it is desirable to have means for lifting the said device in order to release the link. The most practicable means is in the form of a chain K, which is connected to the dog, passes upward through an opening t, and is provided with a handle u, or otherwise so arranged that it may be drawn upon to lift the dog. Instead of a chain a rod or bar may be employed; or, if desired, a handle-lever may be connected to one end of the bolt e, as shown at dotted lines s, Fig. 2, and the bolt may be angular or fastened to the dog, so that by rocking the bolt by means of the handle S the dog may be lifted.

To avoid the necessity of the brakeman entering between the bumpers of the car for the purpose of raising the dog G, I prefer to carry the chain K back behind a guide-roll 6 to the end of a lever T, pivoted at m and having a curved face n, concentric with the said pivot, the said chain being fastened at 7 to the end of the said curved face, so that when the lever is swung down to the position shown in dotted lines, Fig. 3, the chain will be laid upon the face n, and the movements of the lever will have no effect in carrying the chain to one side or the other away from the line of the roller 6—that is, the draft upon the chain will at all times be vertical.

If the end of the dog is cut off at the point 2, as before described, in this case, and also when the pin G' is used, the roller 3, after the link has been secured, will bear upon the link, and, together with the weight of the roller 4, will hold the link in position.

By the use of rollers or spheres I avoid the friction and wear incident to sliding blocks, insure greater certainty of operation, and can reduce the extent of the inclination of the surface w.

Without limiting myself to the precise construction and arrangement of parts shown and described, I claim—

1. A car-coupling provided with a device for retaining the link with a roller 3 for holding said device in its elevated position and a roller 4 resting on an inclined bearing and bearing on the roller 3, substantially as described.

2. The combination, in a car-coupling, of a draw-bar having a retaining device for the link, an inclined bearing w', a roller adapted to engage and hold up the retaining device when elevated, and a second roller bearing on the first and on the bearing w, substantially as described.

3. The combination of the draw-head having an inclined face w and socket y, a dog with its head resting in said socket, and two rollers 3 4, substantially as and for the purpose set forth.

4. The combination of the draw-head, its face w, and rollers 3 4, and a dog G, having a tongue b, substantially as described.

5. The combination of the draw-bar, dog G, and lever T, having a face n concentric with its pivot, substantially as described.

In testimony whereof I have signed my name to this specification in the presence of two subscribing witnesses.

FOSTER DICKEY.

Witnesses:
C. S. DRURY,
ALLE N. DOBSON.